United States Patent Office 3,301,916
Patented Jan. 31, 1967

3,301,916
DOUBLE BOND ISOMERIZATION OF OLEFINS USING ANHYDROUS METAL SULFATE CATALYSTS
Robert Chalmers Pitkethly, John Frederick Ford, and Arnold Fisher, all of Sunbury-on-Thames, England, assignors to The British Petroleum Company Limited, London, England, a British joint-stock corporation
No Drawing. Filed Sept. 25, 1963, Ser. No. 311,301
Claims priority, application Great Britain, Nov. 7, 1962, 42,081/62
10 Claims. (Cl. 260—683.2)

This invention relates to a process for the isomerisation of hydrocarbons.

According to this invention there is provided a process for the isomerisation of a hydrocarbon which is capable of undergoing skeletal re-arrangement and/or double bond shift which process comprises isomerising the hydrocarbon with an anhydrous neutral sulphate of a metal or an anhydrous chromium sulphate or anhydrous cobalt sulphate, the sulphate being carried on an inactive support as hereafter defined.

By "inactive support" is meant a support which, if employed in the absence of an anhydrous neutral sulphate, an anhydrous chromium sulphate or an anhydrous cobalt sulphate, does not cause isomerisation of a hydrocarbon, and which has a benzene adsorption value of less than 3, and preferably less than 1, micromole benzene per gram support when measured at 193° C. with a benzene partial pressure of 0.1 mm. mercury.

The term "neutral sulphate" is used herein with reference to a sulphate which produces a solution having a pH equal to or greater than 6.0 as measured by pH meter when the solution is prepared according to either the following methods. A 0.1 M solution of the sulphate may be prepared by dissolving the requisite amount of the sulphate in an appropriate quantity of de-ionised water which has recently been distilled under an atmosphere of nitrogen. In the case of a sulphate which does not dissolve in sufficient concentration to form a 0.1 M solution, a saturated solution of the sulphate in water as described above may be prepared.

Suitably the metal sulphate is selected from sulphates of metals of Groups II, III, V, VI or VIII of the Periodic Table according to Mendeléef or from sulphates of tin, lead, titanium or manganese.

Preferably the sulphates are of the empirical formula $X_2(SO_4)_n$ where X represents the metal atom and $n$ its valency.

Preferably the catalyst does not contain free metal and does not contain metal compounds other than the metal sulphates herein described or metal compounds formnig all or part of the inactive support.

Preferably the anhydrous sulphates are obtained by the dehydration of hydrated forms of the sulphates; dehydration will usually be effected by heating the hydrated salt; heating will in general be carried out at a temperature at which substantially no decomposition of the sulphate takes place.

Preferred sulphates are the sulphates of magnesium, manganese and nickel.

Preferably the support has a surface area greater than 100 sq. m./gm.

Preferably the support is silica gel; however, other supports may be used if desired. Preferably the silica gel is formed by acid precipitation from a solution of a silicate, for example, sodium silicate, or by hydrolysis of an organic silicate, preferably an alkyl silicate, for example, ortho-ethyl silicate.

Preferably the catalyst comprises from 5% to 40%, most preferably from 5% to 20%, by weight of total weight of neutral sulphate and/or cobalt and/or chromium sulphate.

Preferably the process is carried out in vapour phase.
Preferably the process is carried out at elevated temperature in the range 50°–500° C. In general, using an olefin hydrocarbon, relatively higher temperatures favour skeletal rearrangement and relatively lower temperatures favour a double bond shift.

Preferably the process is carried out with a hydrocarbon L.H.S.V. in the range 0.1 to 10 vol./vol.

Preferably the process is carried out in the presence of an inert gaseous diluent. Nitrogen is a suitable diluent.

Preferably the ratio of hydrocarbon to diluent is in the range 0.1:1 to 10:1.

The feedstock to the process according to the invention may be any hydrocarbon capable of undergoing skeletal rearrangement and/or double bond shift. Thus there may be used acyclic hydrocarbons. If desired, cyclic hydrocarbons may be employed; in general these are more easily isomerised than acyclic hydrocarbons.

By way of illustration, suitable feedstocks include 3,3-dimethylbutene-1 and 4-methylpentene-1.

The pressure employed may be sub-atmospheric, atmospheric or superatmospheric.

4-methylpentene-1 undergoes isomerisation, preferably at 100–200° C. using magnesium sulphate, to give substantial yields of 2-methylpentene-2.

In general, isomerisation takes place without substantial cracking. The invention is illustrated but not limited by the following examples.

*Example 1*

An anhydrous magnesium sulphate catalyst was prepared in the following manner: magnesium sulphate heptahydrate (Analar grade) was heated at 350° C. for 2 hours. The resulting material was graded to 6–12 mesh BSS. This catalyst is used for purposes of comparison only and a process of isomerisation in which it is employed constitutes no part of the present invention.

The bulk density of this catalyst was 0.4691 gram/ml.

A magnesium sulphate on silica gel catalyst was prepared in the following manner:

Magnesium sulphate heptahydrate (23 g.) dissolved in water (40 ml.) was added to 50 g. silica gel (BET=350 m.²/g.) and the mixture allowed to stand overnight. The silca gel employed was that sold under the trade name "Sorbosil." It had a benzene absorption value of 0.243 micromole benzene per gm. silica gel when measured at 193° C. with a benzene partial pressure of 0.1 mm. Hg. After heating at 80° C. for 5 hours the supernatant liquid was decanted and the remaining solid dried at 110° C. The solid was finally calcined in air at 350° C. for 3 hours. The MgSO₄ content was 13 percent by weight.

The bulk density of this catalyst was 0.6637 gram/ml.

In four runs, 4-methylpentene-1 (in gaseous phase) was passed over a 1 ml. bed of the catalyst at a liquid hourly space velocity of 2.0 and at atmospheric pressure in the presence of oxygen-free nitrogen as a carrier gas, used at a flow rate of 10 ml./min.

Reaction temperatures and the compositions of the product obtained after two hours on stream as determined by gas liquid chromatography are shown in the following Table 1.

TABLE 1

| Catalyst | Composition of product (percent weight) | | | |
|---|---|---|---|---|
| | Anhydrous MgSO$_4$ | | MgSO$_4$/silica gel | |
| Reaction temperature °C | 190 | 440 | 190 | 440 |
| Unchanged feed | 4 | 55 | 5 | 4 |
| cis- and trans-4-methylpentene-2 | 48 | 29 | 32 | 15 |
| 2-methylpentene-1 | 9 | 5 | 13 | 14 |
| 2-methylpentene-2 | 30 | 8 | 41 | 35 |
| cis- and trans-3-methylpentene-2 | 9 | 3 | 10 | 30 |
| 2:3-dimethylbutene-2 | 0 | 0 | 0 | 3 |
| Cracked products | 0 | 0 | 0 | 0 |

Example 2

A zinc sulphate on silica gel catalyst was prepared in a similar manner to the magnesium sulphate on silica gel catalyst described with reference to Example 1. The zinc sulphate content was 20% by weight of the total weight of the catalyst.

4-methylpentene-1 (in gaseous phase) was passed over a 1 ml. bed of the catalyst at a L.H.S.V. of 2.0 vol./vol., at a temperature of 190° C. and at atmospheric pressure, in the presence of oxygen-free nitrogen as a carrier gas used at a flow rate of 10 ml./min.

The effluent from the reaction chamber after two hours on stream was analysed by gas liquid chromatography.

The results set out in column 1 of Table 2 were obtained.

Example 3

A thorium sulphate on silica gel catalyst was prepared in a similar manner to the zinc sulphate on silica gel catalyst described with reference to Example 1. The thorium sulphate content was 2% by weight of the total weight of the catalyst.

4-methylpentene-1 was then contacted with the catalyst and the reaction products analysed, under the same conditions as those described with reference to Example 2.

The results set out in column 2 of Table 2 were obtained.

Example 4

A vanadyl sulphate on silica gel catalyst was prepared in a similar manner to the zinc sulphate on silica gel catalyst described with reference to Example 1. The vanadyl sulphate content was 8% by weight of the total weight of the catalyst.

4-methylpentene-1 was then contacted with the catalyst, and the reaction products analysed, under the same conditions as those described with reference to Example 2.

The results set out in column 3 of Table 2 were obtained.

Example 5

A chromic sulphate on silica gel catalyst was prepared in a similar manner to the zinc sulphate on silica gel catalyst described with reference to Example 1. The chromic sulphate content was 8% by weight of the total weight of the catalyst.

4-methylpentene-1 was then contacted with the catalyst, and the reaction products analysed, under the same conditions as those described with reference to Example 2.

The results set out in column 4 of Table 2 were obtained.

Example 6

A manganous sulphate on silica gel catalyst was prepared in a similar manner to the zinc sulphate on silica gel catalyst described with reference to Example 1. The manganous sulphate content was 11% by weight of the total weight of the catalyst.

4-methylpentene-1 was then contacted with the catalyst, and the reaction products analysed, under the same conditions as those described with reference to Example 2.

The results set out in column 5 of Table 2 were obtained.

Example 7

A nickel sulphate on silica gel catalyst was prepared in a similar manner to the zinc sulphate on silica gel catalyst described with reference to Example 1. The nickel sulphate content was 20% by weight of the total weight of the catalyst.

4-methylpentene-1 was then contacted with the catalyst, and the reaction products analysed, under the same conditions as those described with reference to Example 2.

The results set out in column 6 of Table 2 were obtained.

TABLE 2

| | Composition of Product (Percent Weight) | | | | | |
|---|---|---|---|---|---|---|
| | 1 | 2 | 3 | 4 | 5 | 6 |
| | Zinc | Thorium | Vanadyl | Chromium | Manganese | Nickel |
| Unchanged feed | 12 | 8 | 33 | 1 | 8 | 1 |
| cis plus tr-4-methylpentene-2 | 38 | 30 | 31 | 11 | 34 | |
| 2-methylpentene-1 | 10 | 12 | 6 | 11 | 11 | |
| 2-methylpentene-2 | 33 | 40 | 25 | 45 | 38 | |
| cis plus tr-3-methylpentene-2 | 6 | 10 | 5 | 30 | 9 | |
| 2:3-dimethylbutene-1 | 1 | 0 | 0 | 2 | 0 | |
| Cracked products | | | | | | |

We claim:

1. A process for the isomerization of an isomerizable olefin containing 4 to 6 carbon atoms per molecule which comprises contacting said olefin under iosmerization conditions with a catalyst consisting of an anhydrous metal sulphate carried on an inactive support, said anhydrous metal sulphate selected from the group consisting of the anhydrous sulphates of metals of Groups II, V, VI and VIII of the Periodic Table according to Mendeléef and the anhydrous sulphates of manganese.

2. A process according to claim 1 wherein the sulphate is selected from the group consisting of a sulphate of magnesium, manganese and nickel.

3. A process according to claim 1 wherein the support has a surface area greater than 100 sq. m./gm.

4. A process according to claim 1 wherein the support is silica gel.

5. A process according to claim 1 wherein the metal sulphate comprises from 5%–40% by weight of the total weight of the catalyst.

6. A process according to claim 1 wherein the said olefin is in the vapour phase when contacted with the catalyst.

7. A process according to claim 6 wherein the said olefin is contacted with the catalyst at a temperature in the range 50°–500° C.

8. A process according to claim 7 wherein the said olefin L.H.S.V. is in the range 0.1–10 vol./vol.

9. A process according to claim 8 wherein the said olefin is contacted with the catalyst in the presence of an inert gaseous diluent.

10. A process according to claim 9 wherein the ratio of said olefin to diluent is in the range 0.1:1 to 10:1.

References Cited by the Examiner

UNITED STATES PATENTS

| | | | |
|---|---|---|---|
| 2,298,931 | 10/1942 | Drennan | 260—683.2 |
| 2,423,612 | 7/1947 | Mulligan et al. | 260—683.2 |
| 2,538,248 | 1/1951 | Ipatieff et al. | 260—683.2 |
| 2,554,251 | 5/1951 | Hudson | 260—683.2 |
| 2,732,329 | 1/1956 | Doumani | 252—440 |
| 2,871,200 | 1/1959 | Doumani | 252—440 |
| 2,939,896 | 6/1960 | Myers | 252—440 |
| 3,132,110 | 5/1964 | Hansford | 260—683.65 |
| 3,238,272 | 3/1966 | Nixon | 260—683.2 X |

DELBERT E. GANTZ, *Primary Examiner.*

R. H. SHUBERT, *Assistant Examiner.*